(12) United States Patent
Wang

(10) Patent No.: US 11,451,400 B2
(45) Date of Patent: Sep. 20, 2022

(54) BLOCKCHAIN TRANSACTION METHOD AND APPARATUS

(71) Applicant: Advanced New Technologies Co., Ltd., Grand Cayman (KY)

(72) Inventor: Jiyuan Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/161,616

(22) Filed: Jan. 28, 2021

(65) Prior Publication Data

US 2021/0160082 A1    May 27, 2021

Related U.S. Application Data

(63) Continuation of application No. PCT/CN2019/103062, filed on Aug. 28, 2019.

(30) Foreign Application Priority Data

Oct. 26, 2018   (CN) .......................... 201811260935.8

(51) Int. Cl.
*H04L 9/32*        (2006.01)
*H04L 9/14*        (2006.01)
*G06F 16/23*       (2019.01)

(52) U.S. Cl.
CPC ........ *H04L 9/3247* (2013.01); *G06F 16/2379* (2019.01); *H04L 9/14* (2013.01); *H04L 2209/38* (2013.01)

(58) Field of Classification Search
None
See application file for complete search history.

(56) References Cited

U.S. PATENT DOCUMENTS

| 2017/0083907 A1 | 3/2017 | McDonough et al. |
| 2017/0310653 A1 | 10/2017 | Zhang et al. |

(Continued)

FOREIGN PATENT DOCUMENTS

| CN | 107566117 | 1/2018 |
| CN | 107944255 | 4/2018 |

(Continued)

OTHER PUBLICATIONS

Min et al., A Permissioned Blockchain Framework for Supporting Instant Transaction and Dynamic Block Size, 2016 IEEE TrustCom-BigDataSe-ISPA, pp. 90-96. (Year: 2016).*

(Continued)

*Primary Examiner* — Luu T Pham
*Assistant Examiner* — Edward X Long
(74) *Attorney, Agent, or Firm* — Fish & Richardson P.C.

(57) ABSTRACT

One or more embodiments of the present specification provide blockchain-based transaction methods, apparatuses, and electronic devices. A target transaction sent by a node device of a transaction initiator is received. An account of the transaction initiator corresponds to a plurality of public keys, and the target transaction includes transaction content and a digital signature. The digital signature is created by using one or more private keys corresponding to the plurality of public keys of the account and is created based on at least a part of the transaction content. The target transaction is verified, including verifying whether the digital signature is valid. In response to a successful verification, the target transaction is recorded to a distributed database of a blockchain based on a consensus rule of the blockchain.

11 Claims, 3 Drawing Sheets

(56) References Cited

U.S. PATENT DOCUMENTS

| | | | |
|---|---|---|---|
| 2019/0108543 A1* | 4/2019 | Chan | G06Q 30/0229 |
| 2019/0164157 A1* | 5/2019 | Balaraman | H04L 9/3239 |
| 2019/0295050 A1* | 9/2019 | Chalkias | G06Q 20/3827 |
| 2019/0354963 A1* | 11/2019 | Di Iorio | G06Q 20/223 |

FOREIGN PATENT DOCUMENTS

| | | |
|---|---|---|
| CN | 108280646 | 7/2018 |
| CN | 108564692 | 9/2018 |
| CN | 108632045 | 10/2018 |
| CN | 109583887 | 4/2019 |
| KR | 20180115766 | 1/2018 |

OTHER PUBLICATIONS

Aitzhan et al., Security and Privacy in Decentralized Energy Trading Through Multi-Signatures, Blockchain and Anonymous Message Streams, 2018, IEEE Transactions on Dependable and Secure Computing, vol. 15, No. 5, pp. 840-852 (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/103062, dated Oct. 30, 2019, 9 pages (with partial English translation).

zhuanlan.zhihu.com [online] "Learn About EOS Together: Understand EOS Accounts And Their Permission Mechanisms (with code)", Jun. 2018, retrieved on Feb. 5, 2021, retrived from URL <https://zhuanlan.zhihu.com/p/38490868>, 14 pages (with machine English translation).

PCT International Preliminary Report on Patentability in International Application No. PCT/CN2019/103062, dated Apr. 27, 2021, 11 pages (with partial English translation).

Anonymous, "BitShares Blockchain Foundation," Oct. 13, 2015, retrieved on Jul. 16, 2020, retrieved from URL <https: //www. bitshares. foundation/papers/BitSharesBlockchain.pdf>, 9 pages.

Antonopoulos, "Mastering Bitcoin," Jul. 2017, retrieved on Mar. 18, 2019, retrieved from URL<https://www.oreilly.com/library/view/mastering-bitcoin-2nd/9781491954379/>, 405 pages.

Extended European Search Report in European Application No. 19877498.6, dated Jul. 23, 2021, 9 pages.

* cited by examiner

BLOCKCHAIN TRANSACTION METHOD AND APPARATUS

CROSS-REFERENCE TO RELATED APPLICATIONS

This application is a continuation of PCT Application No. PCT/US2019/103062, filed on Aug. 28, 2019, which claims priority to Chinese Patent Application No. 201811260935.8, filed on Oct. 26, 2018, and each application is hereby incorporated by reference in its entirety.

TECHNICAL FIELD

The present specification relates to the field of computer network technologies, and in particular, to blockchain transaction methods and apparatuses.

BACKGROUND

A blockchain technology, also known as a distributed ledger technology, is a new technology that several computing devices participate in "bookkeeping" and jointly maintain a complete distributed database. The blockchain technology features decentralization and transparency. In addition, each computing device can participate in database recording, and data synchronization between the computing devices can be fastly implemented. Therefore, the blockchain technology has been widely used in many fields.

SUMMARY

In view of the previously described blockchain technology status, the present specification provides blockchain transaction methods. An account of a transaction initiator corresponds to a plurality of public keys, and the method includes the following: receiving a target transaction sent by a node device of the initiator, where the target transaction includes transaction content and a digital signature created by using a private key corresponding to a plurality of public keys of the account based on at least a part of the transaction content; and verifying the target transaction, so that after the verification is passed, the target transaction is recorded to a distributed database of a blockchain based on a consensus rule of the blockchain, where the verifying includes verifying whether the digital signature is valid.

In some embodiments, the plurality of public keys of the account respectively correspond to predetermined transaction weights; and the verifying further includes verifying whether the sum of predetermined transaction weights of public keys corresponding to private keys using which valid digital signatures are created meets a predetermined weight threshold.

In some embodiments, the transaction content includes the predetermined weight threshold.

In some embodiments, the transaction content further includes target transaction weights corresponding to several public keys of the account, and the target transaction weights corresponding to the several public keys are not greater than predetermined transaction weights corresponding to the several public keys of the account; and the verifying whether the sum of predetermined transaction weights of public keys corresponding to private keys using which valid digital signatures are created meets a predetermined weight threshold includes the following: verifying whether the sum of target transaction weights of the public keys corresponding to the private keys using which the valid digital signatures are created meets the predetermined weight threshold.

In some embodiments, an identifier of the account of the transaction initiator is a unique identifier obtained based on a name of the initiator.

Correspondingly, the present specification further provides blockchain transaction apparatuses. An account of a transaction initiator corresponds to a plurality of public keys, and the apparatus includes the following: a receiving unit, configured to receive a target transaction sent by a node device of the initiator, where the target transaction includes transaction content and a digital signature created by using a private key corresponding to a plurality of public keys of the account based on at least a part of the transaction content; and a verifying unit, configured to verify the target transaction, so that after the verification is passed, the target transaction is recorded to a distributed database of a blockchain based on a consensus rule of the blockchain, where the verifying includes verifying whether the digital signature is valid.

In some embodiments, the plurality of public keys of the account respectively correspond to predetermined transaction weights; and the verifying unit is configured to verify whether the sum of predetermined transaction weights of public keys corresponding to private keys using which valid digital signatures are created meets a predetermined weight threshold.

In some embodiments, the transaction content includes the predetermined weight threshold.

In some embodiments, the transaction content further includes target transaction weights corresponding to several public keys of the account, and the target transaction weights corresponding to the several public keys are not greater than predetermined transaction weights corresponding to the several public keys of the account; and the verifying unit is configured to verify whether the sum of target transaction weights of the public keys corresponding to the private keys using which the valid digital signatures are created meets the predetermined weight threshold.

In some embodiments, an identifier of the account of the transaction initiator is a unique identifier obtained based on a name of the initiator.

The present specification further provides a computer device, including a memory and a processor. The memory stores a computer program that can be executed by the processor, and the processor executes the computer program to perform steps of the previously described blockchain transaction method.

The present specification further provides a computer readable storage medium, storing a computer program. When the computer program is executed by a processor, steps of the previously described blockchain transaction method are performed.

It can be seen from the previously described technical solutions that, according to the blockchain transaction methods and apparatuses provided in the present specification, a user account can correspond to a plurality of public keys (or public-private key pairs), so that the risk of account loss can be effectively reduced. In addition, for any transaction, entities behind the public keys (or public-private key pairs) can find a solution through voting by using digital signatures, so that each transaction initiated by the account is a result of multi-party consensus. Therefore, an account system based on the previously described technical solutions has great application space in multi-party cooperation scenarios.

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with the present specification. On the contrary, the implementations are only examples of apparatuses and methods that are described in the appended claims in detail and consistent with some aspects of the present specification.

It is worthwhile to note that, steps of corresponding methods in other embodiments are not necessarily performed in the order shown and described in the present specification. Methods in some other embodiments can include more or less steps than those described in the present specification. In addition, a single step described in the present specification may be divided into a plurality of steps for description in other embodiments, and a plurality of steps described in the present specification may also be combined into a single step for description in other embodiments.

A user account of a conventional blockchain usually corresponds to one valid public key (or one valid public-private key pair). The valid public key is displayed in a user account state of the blockchain or stored in a distributed database of the blockchain in another form, and can be obtained by any node device on the blockchain. A private key corresponding to the valid public key is stored in a local database or another hardware terminal of a node device of the user for the user to perform digital signing or other encryption or decryption operations related to the private key. After a file or hardware terminal storing the private key is lost or divulged, the blockchain account can no longer be used by the user to initiate any transaction, and virtual resources in the blockchain account may even be stolen.

Figure 1:
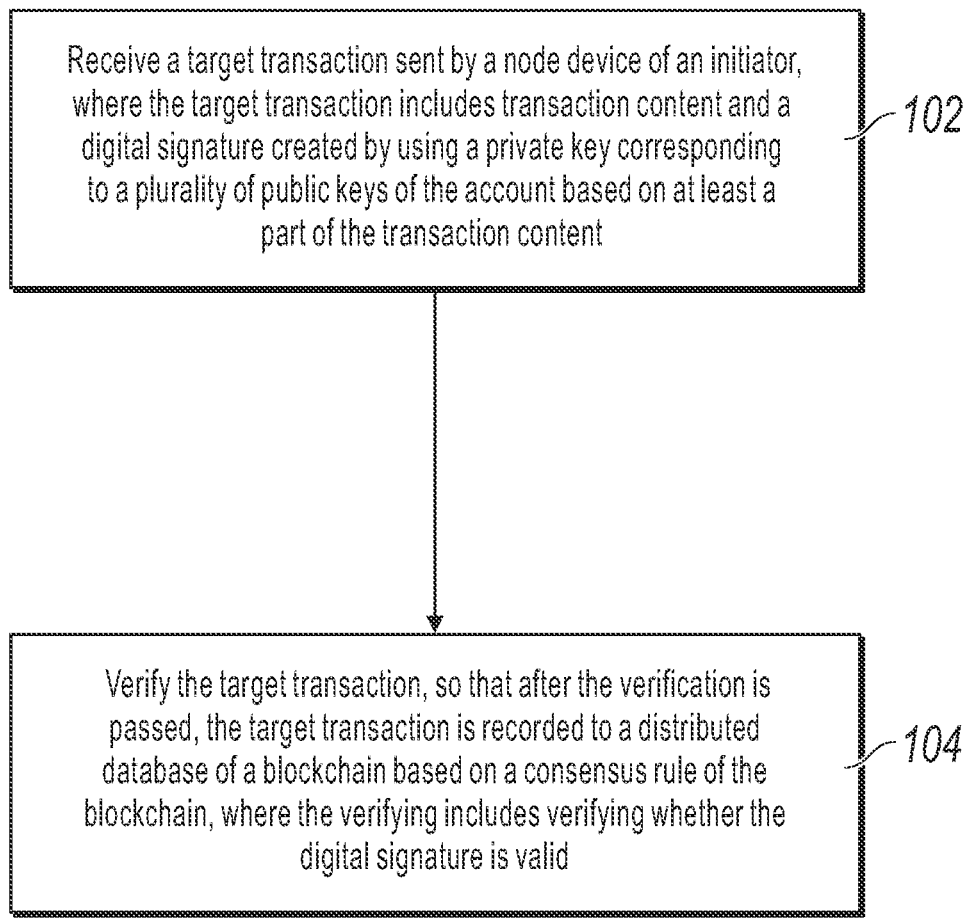
FIG. 1 is a flowchart illustrating a blockchain transaction method, according to some embodiments of the present specification.

To alleviate the previously described problem in the existing technology, as shown in FIG. 1, some example embodiments of the present specification provide a blockchain transaction method. An account of a transaction initiator corresponds to a plurality of public keys, and the plurality of public keys are generated by using a plurality of private keys.

A blockchain in some embodiments can be a peer to peer (P2P) network system that is formed by node devices by using a consensus mechanism and that has a distributed data storage structure. Data in the blockchain is distributed on "blocks (block)" that are connected to each other in terms of time. A latter block includes a data digest of a previous block. In addition, full data backup of all or some of the node devices is achieved based on different consensus mechanisms (for example, Proof of Work (PoW), Proof of Stake (PoS), Delegated Proof of Stake (DPoS), and Practical Byzantine Fault Tolerance (PBFT)). A person skilled in the art intimately knows that because the blockchain system operates under a corresponding consensus mechanism, it is difficult for any node to tamper with data that has been recorded to the blockchain database. For example, an attack of tampering with the existing data on a blockchain based on POW consensus needs at least 51% computing power of the whole network. Therefore, the blockchain system has the feature of ensuring data security and preventing attacks and tampering, which is incomparable to other centralized database systems.

It is worthwhile to note that, the node device in the present specification can not only include a full node device that backs up full data of the distributed database of the blockchain, but also include a light node device that backs up a part of the data of the distributed database of the blockchain, and other end-user devices or client devices. The node device is not limited in the present specification.

As described in this embodiment, the account of the transaction initiator corresponds to the plurality of public keys. Because public keys and private keys are in one-to-one correspondence, "the account of the transaction initiator corresponds to the plurality of public keys" can also be understood as "the account of the transaction initiator corresponds to a plurality of public-private key pairs". The plurality of public keys or public-private key pairs corresponding to the account of the transaction initiator can be used as a plurality of alternate identities of the transaction initiator user, to prevent a private key from being lost or divulged, thereby ensuring security of the account. The plurality of public keys or public-private key pairs can also be used as a plurality of entity identities related to or managed by the transaction initiator user, and the plurality of entities jointly represent the transaction initiator user.

A generation algorithm of the public-private key pair is not limited here. A corresponding public key can be obtained through calculation based on an asymmetric encryption algorithm (such as Rivest-Shamir-Adleman (RSA) or an elliptic curve algorithm) by using a private key, or a pair of keys can be obtained based on an encryption algorithm.

A person skilled in the art intimately knows that as a publicly available key, the public key can be stored in the distributed database of the blockchain or displayed in a user account state of the blockchain. The corresponding private key can be stored in a local database of a node device of the transaction initiator user. In this embodiment, to ensure security of the private keys and prevent the private keys from being lost or divulged, the plurality of private keys corresponding to the plurality of public keys can be stored in local databases or hardware terminals of different node devices. Especially when the plurality of public keys (or public-private key pairs) represent a plurality of entity identities related to or managed by the transaction initiator user, to ensure fair decision-making of the plurality of entities, the plurality of private keys should be stored in local databases of node devices that the plurality of entities are located in, or in a plurality of hardware terminals that are respectively held by the plurality of entities.

As shown in FIG. 1, the blockchain transaction method includes the following steps.

Step 102: Receive a target transaction sent by a node device of the initiator, where the target transaction includes transaction content and a digital signature created by using a private key corresponding to a plurality of public keys of the account based on at least a part of the transaction content.

The transaction (transaction) in the present specification refers to data that is created by a user by using a node device of the blockchain and that needs to be finally deployed in the distributed database of the blockchain. There are a transaction in a narrow sense and a transaction in a broad sense in the blockchain. The transaction in a narrow sense refers to value transfer deployed by the user to the blockchain. For example, in a conventional bitcoin blockchain network, the transaction can be transfer initiated by the user in the blockchain. However, the transaction in a broad sense refers to arbitrary data deployed by the user to the blockchain. For example, an operator can establish a consortium blockchain based on actual service needs, and deploy some other types of online services (such as a house rental service, a vehicle scheduling service, an insurance claim service, a credit service, and a medical service) unrelated to value transfer depending on the consortium blockchain. In such a consortium blockchain, the transaction can be a service message or a service request that is deployed by the user to the consortium blockchain and that has a service intention. For another example, in an account-type blockchain, the transaction can also be data (such as an account balance) sent by the user to the blockchain to change the user account state. Therefore, arbitrary data deployed by the user to the distributed database of the blockchain belongs to the "transaction" in the present invention, regardless of whether the arbitrary data is stored in the block body, the block header, or other locations of the block.

The digital signature created by using the private key corresponding to the plurality of public keys of the account based on at least a part of the transaction content can be one digital signature created by using a private key corresponding to one public key of the account based on at least a part of the transaction content, or a digital multi-signature created by using private keys corresponding to a plurality of public keys of the account based on at least a part of the transaction content. The digital multi-signature can be a plurality of digital signatures created by using the plurality of private keys based on at least a part of the transaction content, or a digital signature overlaying a digital signature created by using a previous private key based on a predetermined signature sequence of the plurality of private keys, or a plurality of digital signatures created by using some of the plurality of private keys and a digital signature overlaying a digital signature created by using a previous private key based on a predetermined signature sequence of the other private keys of the plurality of private keys, or a digital signature created based on another predetermined signature sequence or method, and is not limited here. The digital multi-signature can be created by using all private keys corresponding to the account of the transaction initiator, or created by using some of the private keys corresponding to the account of the transaction initiator, which is not limited here.

It is worthwhile to further note that, in some special service scenarios, the transaction content of the target transaction can be empty, that is, not displayed in the target transaction, and the digital signature is created by using a private key corresponding to at least one public key of the account based on the transaction content not displayed in the target transaction.

Step 104: Verify the target transaction, so that after the verification is passed, the target transaction is recorded to a distributed database of a blockchain based on a consensus rule of the blockchain, where the verifying includes verifying whether the digital signature is valid.

For specific settings of transaction verification rules based on the blockchain protocol, the verification of the target transaction by the node device of the blockchain can at least include verifying the validity of the digital signature included in the target transaction. The validity verification usually includes verifying whether the public key of the signer of the digital signature belongs to the account of the transaction initiator, whether the digital signature is signed based on the predetermined signature sequence, whether the digital signature is obtained based on the transaction content, etc. to ensure that the target transaction is generated and sent by the transaction initiator user or entities corresponding to several public keys in the account of the transaction initiator, thereby preventing malicious tampering or attacks from other parties. The verification of the target transaction may further include verification of a data content format of the target transaction, whether the transaction is a replay transaction, etc., which is not limited here.

A specific process of recording the verified target transaction to the distributed database of the blockchain varies with different consensus rules of the blockchain. In some embodiments, the specific process of recording the verified target transaction to the distributed database of the blockchain includes the following: nodes with bookkeeping permission in the blockchain record the verified target transaction to a candidate block; a consensus bookkeeping node meeting a consensus rule of the blockchain is determined from the nodes with bookkeeping permission; the consensus bookkeeping node broadcasts the candidate block to the nodes of the blockchain; and after the candidate block is verified and approved by a predetermined quantity of nodes of the blockchain, the candidate block is regarded as the latest block and recorded to the distributed database of the blockchain.

In the previously described embodiment, the node with bookkeeping permission is a node with permission to generate a candidate block. Based on the consensus rule of the blockchain, the consensus bookkeeping node can be determined from the nodes with bookkeeping permission for the candidate block. The consensus rule can include PoW, PoS, DPoS, PBFT, or other specific consensus rules specified in the blockchain protocol.

According to the blockchain transaction method provided in the previously described embodiment, a user account can correspond to a plurality of public keys (or public-private key pairs), so that the risk of account loss can be effectively reduced. In addition, for any transaction, users or entities behind the public keys (or public-private key pairs) can find a solution through voting by using a multi-signature, so that each transaction initiated by the account is a result of multi-party consensus. Therefore, an account system based on the previously described technical solution has great application space in multi-party cooperation scenarios.

In some embodiments, predetermined transaction weights are set for the plurality of public keys (or public-private key pairs) corresponding to the account of the transaction initiator to represent voting weights of the entities represented by the public keys (or public-private key pairs) in decision-making on behalf of the user of the transaction initiator. The predetermined transaction weights can be represented by percentages or other values, exponents, or coefficients in the user account state of the blockchain.

Correspondingly, a predetermined weight threshold should be set for the target transaction to verify whether the sum of predetermined transaction weights of private keys (or public keys corresponding to the private keys) using which valid digital signatures are created meets the predetermined weight threshold in the verification of the target transaction, and if yes, the verification is passed. The sum of the transaction weights corresponding to the valid digital signatures being greater than the predetermined weight threshold indicates that the sum of decision-making weights of public keys or entities that approve the transaction content of the target transaction in the account is greater than the predetermined threshold, and the transaction content should be approved. The corresponding predetermined transaction weights that are set for the plurality of public keys in the account reflect decision-making weights or voting capabilities of the plurality of entities represented by the plurality of public keys. The decision-making weights or voting capabilities are reflected by the valid digital signatures created for the transaction content of the target transaction by the plurality of entities by using the corresponding private keys. Therefore, this technical solution is widely used in decentralized decision-making of the blockchain account.

The predetermined weight threshold can be set in many ways. For example, the blockchain system can set the weight threshold for the target transaction in underlying protocol code, and different predetermined weight thresholds can be set for different types of target transactions; or the blockchain user can set the predetermined weight threshold for each target transaction sent by the account of the user, and further record the predetermined weight threshold corresponding to each target transaction to the transaction content. The ways are not limited here.

Figure 2:
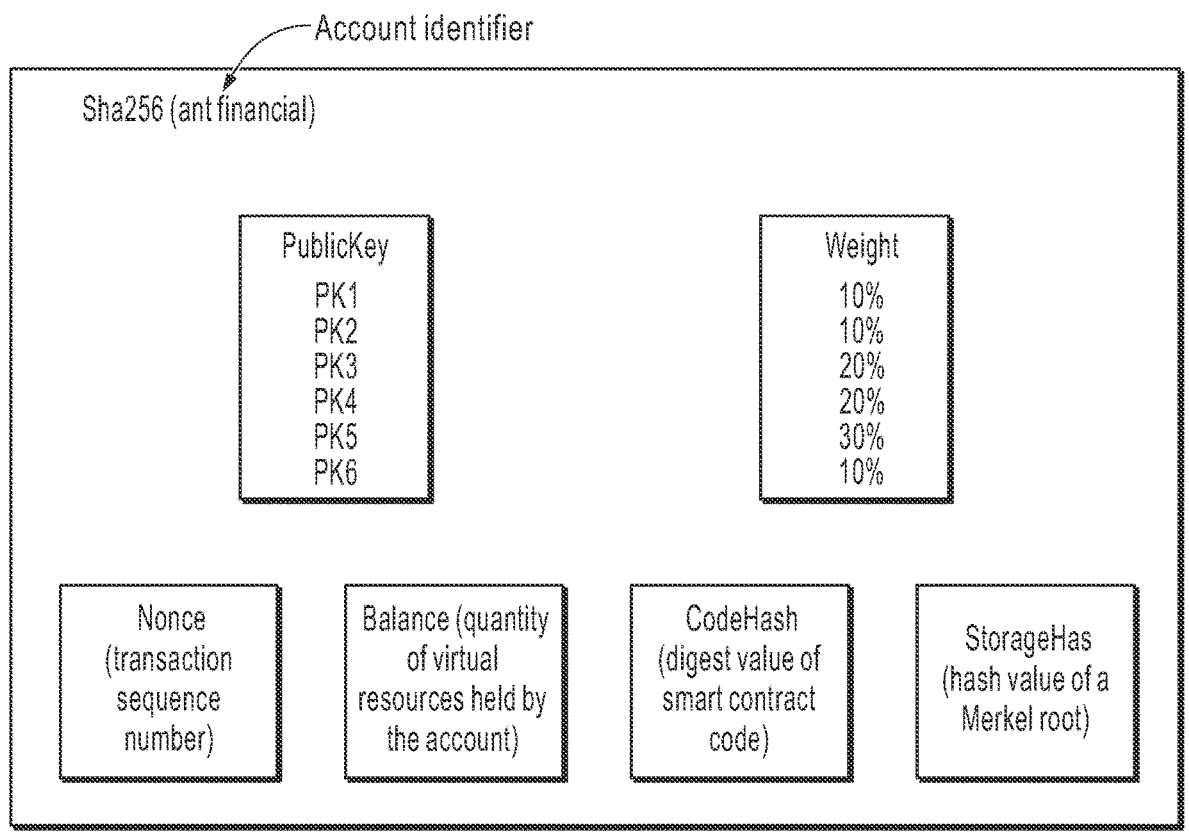
FIG. 2 is a schematic diagram illustrating a state of a user account in a distributed blockchain database, according to some example embodiments of the present specification.

FIG. 2 illustrates a state of a user account in a distributed blockchain database, according to some example embodiments of the present specification. Nonce is a transaction sequence number that strictly increases with the sent transaction to prevent replay attacks. Balance is the quantity of virtual resources held by the account. CodeHash is a digest value of smart contract code of the account. PublicKey is the public key corresponding to the account. StorageHash is a hash value of a Merkel root formed by account state content.

As shown in FIG. 2, the user account corresponds to a plurality of public keys, namely public keys 1 to 6, and the public keys 1 to 6 respectively correspond to predetermined transaction weights 10%, 10%, 20%, 20%, 30%, and 10%. Optionally, the predetermined transaction weights of the public keys 1 to 6 can also be represented as 1, 1, 2, 2, 3, and 1 or a, a, 2a, 2a, 3a, and a, or in other forms.

For example, when transaction content of a target transaction includes a predetermined weight threshold 70%, 7, or 7a, if public keys corresponding to private keys using which valid digital signatures are created in the target transaction are the public keys 1 to 5, because the sum of weights of the public keys 1 to 5 is 90%, 9, or 9a that is greater than the predetermined weight threshold, the verification of a decision-making weight of the target transaction should be passed.

In some embodiments, to ensure flexibility of the plurality of entities corresponding to the blockchain account in the transaction or decision-making, the transaction content can further include target transaction weights corresponding to several public keys of the account. In addition, to ensure fairness in the decision-making, the target transaction weight corresponding to each public key is not greater than the predetermined transaction weight corresponding to the public key in the account. That is, a plurality of entities that create digital signatures on the target transaction can reflect specific decision-making weights in the target transaction, but for the sake of fairness, the specific decision-making weight of each entity for the target transaction cannot be greater than the predetermined transaction weight that is specified in the blockchain account of the user and determined based on consensus of the blockchain nodes.

Correspondingly, to verify the decision-making weight of the target transaction, whether the sum of target transaction weights of the public keys corresponding to the private keys using which the valid digital signatures are created meets the predetermined weight threshold should be verified, and if yes, the target transaction passes the verification.

An account identifier (namely an account address) of a conventional blockchain system is represented by several bytes without specific semantics (for example, Ethereum is represented by 20 bytes), and there are strict mathematical recursion relationships between the account, a private key, and a public key. The conventional blockchain system generates a public-private key pair by using an asymmetric encryption algorithm. The public key can be derived from the private key, and the account address can be calculated by using the public key. For example, an account address of Ethereum is 20-byte code obtained based on a public key by using the Keccak256 hash algorithm, and is represented by 40 bits in the hexadecimal system, for example, in a format of 0x9bA5552cCc83A65A84CFE389B50bb1D4E8AdF9. This format is very unfriendly to users. The account address without semantics is not only easy to be forgotten, but also increases the complexity of use in specific service scenarios.

In one or more previously described embodiments provided in the present specification, the blockchain account of the transaction initiator corresponds to a plurality of public keys (or public-private key pairs), and each public key (or public-private key pair) can represent an entity associated with the transaction initiator user, so that the transaction initiator user can represent an institution, an organization, a company, a family, etc. Compared with conventional blockchain accounts, the blockchain accounts of the users in the previously described embodiments can be decoupled from specific public keys. Therefore, in the embodiments provided in the present specification, expressions that are more user-friendly can be selected for the blockchain account identifier of the transaction initiator. For example, the account identifier of the transaction initiator is a unique identifier obtained based on the name of the initiator, such as a user account name (or can be called another account identifier such as an account address) ant financial shown in FIG. 2, so as to facilitate remembering and use of the account of the initiator. For another example, the account identifier can also be a digital digest etc. based on the name of the initiator, and is not limited here.

Figure 4:
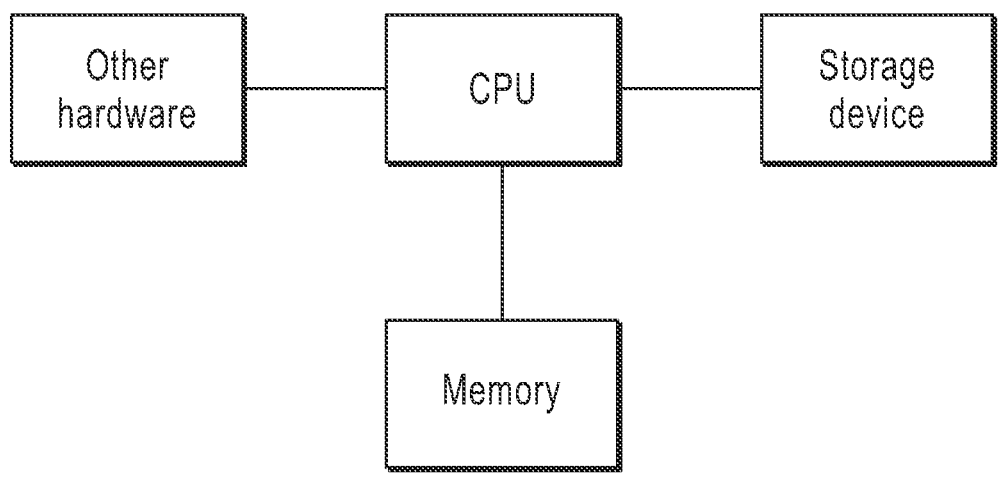
FIG. 4 is a diagram illustrating a hardware structure used to perform blockchain transaction apparatus embodiments provided in the present specification.

Corresponding to the previous procedure implementation, embodiments of the present specification further provide a blockchain transaction apparatus. The apparatus can be implemented by using software, or can be implemented by using hardware, or can be implemented by using a combination of hardware and software. Software implementation is used as an example. As a logic apparatus, the software is formed by reading a corresponding computer program instruction into a memory using a central processing unit (CPU) in a device that the software is located on. In terms of hardware, in addition to a CPU, a memory, and a storage device shown in FIG. 4, the device that the blockchain transaction apparatus is located on usually further includes other hardware such as a chip for sending and receiving radio signals, and/or other hardware such as a card for implementing a network communication function.

Figure 3:
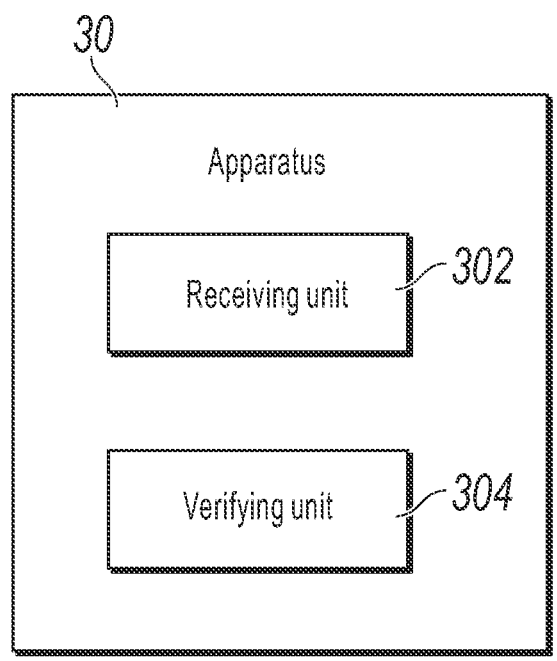
FIG. 3 is a schematic diagram illustrating a blockchain transaction apparatus, according to some embodiments of the present specification.

FIG. 3 illustrates a blockchain transaction apparatus 30. An account of a transaction initiator corresponds to a plurality of public keys, and the apparatus 30 includes the following: a receiving unit 302, configured to receive a target transaction sent by a node device of the initiator, where the target transaction includes transaction content and a digital signature created by using a private key corresponding to a plurality of public keys of the account based on at least a part of the transaction content; and a verifying unit 304, configured to verify the target transaction, so that after the verification is passed, the target transaction is recorded to a distributed database of a blockchain based on a consensus rule of the blockchain, where the verifying includes verifying whether the digital signature is valid.

In some embodiments, the plurality of public keys of the account respectively correspond to predetermined transaction weights; and the verifying unit 304 is configured to verify whether the sum of predetermined transaction weights of public keys corresponding to private keys using which valid digital signatures are created meets a predetermined weight threshold.

In some embodiments, the transaction content includes the predetermined weight threshold.

In some embodiments, the transaction content further includes target transaction weights corresponding to several public keys of the account, and the target transaction weights corresponding to the several public keys are not greater than predetermined transaction weights corresponding to the several public keys of the account; and the verifying unit 304 is configured to verify whether the sum of target transaction weights of the public keys corresponding to the private keys using which the valid digital signatures are created meets the predetermined weight threshold.

In some embodiments, an identifier of the account of the transaction initiator is a unique identifier obtained based on a name of the initiator.

For detailed implementation processes of functions and roles of the units in the previously described apparatus, references can be made to the implementation processes of corresponding steps in the previously described method. For related parts, references can be made to descriptions in the method embodiment. Details are omitted here for simplicity.

The described apparatus embodiment is merely an example. The units described as separate parts can or do not have to be physically separate, and parts displayed as units can or do not have to be physical modules, can be located in one position, or can be distributed on a plurality of network modules. Some or all of the units or modules can be selected based on actual needs to achieve the objectives of the solutions in the present specification. A person of ordinary skill in the art can understand and implement the embodiments of the present specification without creative efforts.

The apparatus, unit, or module described in the previously described embodiments can be implemented by a computer chip or an entity, or implemented by a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previously described method embodiment, embodiments of the present specification further provide a computer device, and the computer device includes a memory and a processor. The memory stores a computer program that can be executed by the processor. When executing the stored computer program, the processor performs steps of the blockchain transaction method in the embodiments of the present specification. For detailed descriptions of the steps of the blockchain transaction method, references can be made to the previous content, and no repetition is needed.

Corresponding to the previously described method embodiment, embodiments of the present specification further provide a computer readable storage medium, and the storage medium stores a computer program. When the computer program is executed by a processor, steps of the blockchain transaction method in the embodiments of the present specification are performed. For detailed descriptions of the steps of the blockchain transaction method, references can be made to the previous content, and no repetition is needed.

The previous descriptions are merely example embodiments of the present specification, but are not intended to limit the present specification. Any modification, equivalent replacement, or improvement made without departing from the spirit and principle of the present specification shall fall within the protection scope of the present specification.

In typical configuration, the computing device includes one or more processors (CPU), an input/output interface, a network interface, and a memory.

The memory can include a form of a volatile memory, a random access memory (RAM) and/or a nonvolatile memory, etc. in a computer readable medium, such as a read-only memory (ROM) or a flash memory (flash RAM). The memory is an example of the computer readable medium.

The computer readable medium includes volatile and nonvolatile, removable and non-removable media, and can store information by using any method or technology. The information can be a computer readable instruction, a data structure, a program module, or other data.

Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include a transitory computer readable medium (transitory media), for example, a modulated data signal and carrier.

It is worthwhile to further note that, the terms "include", "contain", or their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the embodiments of the present specification can be provided as a method, a system, or a computer program product. Therefore, the embodiments of the present specification can use a form of hardware only embodiments, software only embodiments, or embodiments with a combination of software and hardware. In addition, the embodiments of the present specification can use a form of a computer program product that is implemented on one or more computer-usable storage media (including but not limited to a disk memory, a CD-ROM, an optical memory, etc.) that include computer-usable program code.

What is claimed is:

1. A computer-implemented method, comprising:

receiving a target transaction sent by a node device of a transaction initiator, wherein an account of the transaction initiator corresponds to a plurality of public keys and is decoupled from the plurality of public keys such that there is not a mathematical relationship between the account and the plurality of the public keys, and wherein the plurality of public keys of the account corresponds to predetermined transaction weights, wherein the target transaction comprises transaction content and a digital signature createdby using one or more private keys corresponding to the plurality of public keys of the account and based on at least a part of the transaction content, wherein the transaction content comprises two or more target transaction weights corresponding to two or more of the plurality of public keys;

verifying the target transaction, by verifying whether the digital signature is valid, comprising:

computing a first sum of two or more of the predetermined transaction weights corresponding to the two or more of the plurality of public keys;

verifying whether the first sum of the two or more predetermined transaction weights meets a predetermined weight threshold;

verifying whether a second sum of the two or more target transaction weights meets a second predetermined weight threshold, wherein the two or more target transaction weights are determined based on a type of the target transaction, wherein each of two or more of the plurality of public keys of the account represents a single entity in association with the target transaction and corresponds to:

(1) a respective predetermined weight of the predetermined transaction weights; and (2) a respective target transaction weight of the two or more target transaction weights, and wherein the respective target transaction weight is less than the respective predetermined weight; and in response to a successful verification, recording the target transaction to a distributed database of a blockchain based on a consensus rule of the blockchain.

2. The computer-implemented method of claim 1, wherein the transaction content comprises the predetermined weight threshold.

3. The computer-implemented method of claim 1, wherein an identifier of the account of the transaction initiator is a unique identifier obtained based on a name of the transaction initiator.

4. The computer-implemented method of claim 1, wherein verifying the target transaction further comprises one or more of the following:

verifying a data content format of the target transaction; or verifying whether the target transaction is a replay transaction.

5. A non-transitory, computer-readable medium storing one or more instructions executable by a computer system and that upon execution cause the computer system to perform operations comprising:

receiving a target transaction sent by a node device of a transaction initiator, wherein an account of the transaction initiator corresponds to a plurality of public keys and is decoupled from the plurality of public keys such that there is not a mathematical relationship between the account and the plurality of the public keys, and wherein the plurality of public keys of the account corresponds to predetermined transaction weights, wherein the target transaction comprises transaction content and a digital signature created by using one or more private keys corresponding to the plurality of public keys of the account and based on at least a part of the transaction content, wherein the transaction content comprises two or more target transaction weights corresponding to two or more of the plurality of public keys;

verifying the target transaction, by verifying whether the digital signature is valid, comprising:

computing a first sum of the two or more of the predetermined transaction weights corresponding to the two or more of the plurality of public keys;

verifying whether the first sum of two or more predetermined transaction weights meets a predetermined weight threshold;

verifying whether a second sum of the two or more target transaction weights meets a second predetermined weight threshold, wherein the two or more target transaction weights are determined based on a type of the target transaction, wherein each of two or more of the plurality of public keys of the account represents a single entity in association with the target transaction and corresponds to:

(1) a respective predetermined weight of the predetermined transaction weights; and (2) a respective target transaction weight of the two or more target transaction weights, and wherein the respective target transaction weight is less than the respective predetermined weight; and in response to a successful verification, recording the target transaction to a distributed database of a blockchain based on a consensus rule of the blockchain.

6. The non-transitory, computer-readable medium of claim 5, wherein the transaction content comprises the predetermined weight threshold.

7. The non-transitory, computer-readable medium of claim 5, wherein an identifier of the account of the transaction initiator is a unique identifier obtained based on a name of the transaction initiator.

8. The non-transitory, computer-readable medium of claim 5, wherein verifying the target transaction further comprises one or more of the following:

verifying a data content format of the target transaction; or verifying whether the target transaction is a replay transaction.

9. A computer-implemented system, comprising:

one or more computers; and one or more computer memory devices interoperably coupled with the one or more computers and having tangible, non-transitory, machine-readable media storing one or more instructions that, when executed by the one or more computers, cause the one or more computers to perform operations comprising:

receiving a target transaction sent by a node device of a transaction initiator, wherein an account of the transaction initiator corresponds to a plurality of public keys and is decoupled from the plurality of public keys such that there is not a mathematical relationship between the account and the plurality of the public keys, and wherein the plurality of public keys of the account corresponds to predetermined transaction weights, wherein the target transaction comprises transaction content and a digital signature created by using one or more private keys corresponding to the plurality of public keys of the account and based on at least a part of the transaction content, wherein the transaction content comprises two or more target transaction weights corresponding to two or more of the plurality of public keys;

verifying the target transaction, by verifying whether the digital signature is valid, comprising:
- computing a first sum of the two or more of the predetermined transaction weights corresponding to the two or more of the plurality of public keys;
- verifying whether the first sum of two or more predetermined transaction weights meets a predetermined weight threshold;
- verifying whether a second sum of the two or more target transaction weights meets a second predetermined weight threshold, wherein the two or more target transaction weights are determined based on a type of the target transaction, wherein each of two or more of the plurality of public keys of the account represents a single entity in association with the target transaction and corresponds to:
  (1) a respective predetermined weight of the predetermined transaction weights; and
  (2) a respective target transaction weight of the two or more target transaction weights, and wherein-the respective target transaction weight is less than the respective predetermined weight; and
- in response to a successful verification, recording the target transaction to a distributed database of a blockchain based on a consensus rule of the blockchain.

10. The computer-implemented system of claim 9, wherein the transaction content comprises the predetermined weight threshold.

11. The computer-implemented system of claim 9, wherein an identifier of the account of the transaction initiator is a unique identifier obtained based on a name of the transaction initiator.

* * * * *

UNITED STATES PATENT AND TRADEMARK OFFICE
CERTIFICATE OF CORRECTION

PATENT NO. : 11,451,400 B2  
APPLICATION NO. : 17/161616  
DATED : September 20, 2022  
INVENTOR(S) : Jiyuan Wang Page 1 of 1

It is certified that error appears in the above-identified patent and that said Letters Patent is hereby corrected as shown below:

In the Claims

Column 11, Line 18, in Claim 1, delete "createdby" and insert -- create by --.

Column 11, Line 25, in Claim 1, delete "transaction," and insert -- transaction --.

Column 12, Line 17, in Claim 5, delete "transaction," and insert -- transaction --.

Column 13, Line 13, in Claim 9, delete "transaction," and insert -- transaction --.

Signed and Sealed this  
Twenty-second Day of November, 2022

Katherine Kelly Vidal  
*Director of the United States Patent and Trademark Office*